US008806621B2

(12) United States Patent
Maguire (10) Patent No.: US 8,806,621 B2
(45) Date of Patent: Aug. 12, 2014

(54) COMPUTER NETWORK SECURITY PLATFORM

(75) Inventor: John R. Maguire, Falls Church, VA (US)

(73) Assignee: Noblis, Inc., Falls Church, VA (US)

(*) Notice: Subject to any disclaimer, the term of this patent is extended or adjusted under 35 U.S.C. 154(b) by 291 days.

(21) Appl. No.: 12/946,418

(22) Filed: Nov. 15, 2010

(65) Prior Publication Data

US 2011/0119742 A1 May 19, 2011

Related U.S. Application Data

(60) Provisional application No. 61/272,892, filed on Nov. 16, 2009.

(51) Int. Cl.
*H04L 9/32* (2006.01)

(52) U.S. Cl.
USPC .......... 726/22; 380/255; 380/260; 380/276; 713/150; 713/160; 713/181

(58) Field of Classification Search
USPC ......... 726/5, 25; 380/255, 260, 276; 713/150, 713/160, 181
See application file for complete search history.

(56) References Cited

U.S. PATENT DOCUMENTS

| 8,205,240 | B2* | 6/2012 | Ansari et al. ................. 726/1 |
|---|---|---|---|
| 2001/0014150 | A1* | 8/2001 | Beebe et al. ................. 379/189 |
| 2005/0060535 | A1* | 3/2005 | Bartas ................. 713/154 |
| 2005/0060584 | A1* | 3/2005 | Ginter et al. ................. 713/201 |
| 2006/0101520 | A1* | 5/2006 | Schumaker et al. ................. 726/25 |
| 2009/0307776 | A1* | 12/2009 | Curnyn ................. 726/24 |
| 2010/0138925 | A1* | 6/2010 | Barai et al. ................. 726/25 |
| 2010/0275263 | A1* | 10/2010 | Bennett et al. ................. 726/25 |
| 2012/0066759 | A1* | 3/2012 | Chen et al. ................. 726/15 |

* cited by examiner

*Primary Examiner* — Jason K. Gee
*Assistant Examiner* — Sharif E Ullah
(74) *Attorney, Agent, or Firm* — Finnegan, Henderson, Farabow, Garrett & Dunner, LLP (57) ABSTRACT

A computer system for managing security information for an organization includes a scanner execution module configured to automatically execute at least two scanners in a predetermined interval to analyze potential vulnerabilities of a computer environment. A vulnerability is acquired from the at least two scanners and stored in a data store. A user associated with the analyzed computer environment is determined based on the vulnerability stored in the data store, the user is notified of the vulnerability.

18 Claims, 10 Drawing Sheets

Recent Vulnerabilities

| IP Address | Vulnerability Name | Detected | Risk |
|---|---|---|---|
| 10.122.151.6 | CentOS: RHSA-2010-0742 | 2010-10-13 | High |

Total: 1

Remediation Queue

| ID | Vulnerability Name | Days remain | Max age | Detected | IP Address |
|---|---|---|---|---|---|
| 1657 | PHP <5.21 Multiple Vulnerabilities | 5 | 30 days | 2010-09-26 | 10.122.151.48 |
| 1660 | PHP <5.2 Multiple Vulnerabilities | 5 | 30 days | 2010-09-26 | 10.122.151.48 |
| 1661 | PHP <5.2.5 Multiple Vulnerabilities | 5 | 30 days | 2010-09-26 | 10.122.151.48 |
| 1663 | PHP <5.2.6 Multiple Vulnerabilities | 5 | 30 days | 2010-09-26 | 10.122.151.48 |
| 1665 | PHP <5.2.4 Multiple Vulnerabilities | 5 | 30 days | 2010-09-26 | 10.122.151.48 |
| 1667 | PHP 5 <5.2.7 Multiple Vulnerabilities | 5 | 30 days | 2010-09-26 | 10.122.151.48 |
| 1668 | PHP <5.2.1 Multiple Vulnerabilities | 5 | 30 days | 2010-09-26 | 10.122.151.48 |
| 1671 | PHP <5.2 Multiple Vulnerabilities | 5 | 30 days | 2010-09-26 | 10.122.151.48 |
| 1678 | PHP 5 <5.2.7 Multiple Vulnerabilities | 5 | 30 days | 2010-09-26 | 10.122.151.47 |
| 1682 | PHP <5.2.1 Multiple Vulnerabilities | 5 | 30 days | 2010-09-26 | 10.122.151.47 |
| 1685 | PHP <5.2 Multiple Vulnerabilities | 5 | 30 days | 2010-09-26 | 10.122.151.47 |
| 1686 | PHP <5.2.5 Multiple Vulnerabilities | 5 | 30 days | 2010-09-26 | 10.122.151.47 |
| 1688 | PHP <5.2.6 Multiple Vulnerabilities | 5 | 30 days | 2010-09-26 | 10.122.151.47 |
| 1690 | PHP <5.2.4 Multiple Vulnerabilities | 5 | 30 days | 2010-09-26 | 10.122.151.47 |

Assets Assigned to You

| IP Address | Type | OS | Low | Med | High |
|---|---|---|---|---|---|
| 10.122.225.10 | Unknown | | 9 | | |
| 10.121.1.6 | Unknown | | 23 | | |
| 10.121.1.5 | Unknown | | 23 | | |
| 10.121.1.4 | Unknown | | 23 | | |
| 10.121.1.3 | Unknown | | 23 | | |
| 10.122.151.10 | Unknown | | 28 | 2 | |
| 10.122.150.227 | Unknown | | 25 | 6 | |
| 10.122.150.228 | Unknown | | 22 | 2 | |
| 10.122.150.229 | Unknown | | 17 | 2 | |
| 10.122.150.230 | Unknown | | 16 | 2 | |
| 10.122.150.231 | Unknown | | 37 | 8 | |
| 10.122.150.232 | Unknown | | 20 | 14 | 12 |
| 10.122.150.233 | Unknown | | 20 | 14 | 13 |
| 10.122.150.234 | Unknown | | 22 | 2 | |
| 10.122.150.235 | Unknown | | 22 | 2 | |
| 10.122.150.236 | Unknown | | 20 | 2 | |
| 10.122.150.237 | Unknown | | 22 | 2 | |
| 10.122.150.238 | Unknown | | 24 | 2 | |
| 10.122.150.239 | Unknown | | 24 | 2 | |

*FIG. 5*

| Asset Details | | ☑ Edit |
|---|---|---|
| IP Address | 10.122.151.6 | |
| DNS Name | | |
| MAC Address | | |
| OS | | |
| Type | Network Security Host | |
| Description | ScanCenter host for CEP and FedSpace | |
| Business Value (1-100) | 50 | |
| First Seen | 2010-08-07 | |
| Last Seen | 2010-10-21 | |
| Contact(s) | JOHN SMITH (Affiliate) <john.smith@yahoo.com> MIKE JONES (Affiliate) <mike.jones@yahoo.com> | |

Daily Trend x This Host
o Environment Average

Open Items Affecting This Asset

| ID | Risk | Vulnerability Name | Detection Date | Age | Last Seen | Source | Port | Protocol | Service | Scanner Ref |
|---|---|---|---|---|---|---|---|---|---|---|
| 40 | Low | Remote listeners enumeration | 2010-08-07 | 75 days | 2010-10-21 | Nessus | 22 | tcp | ssh | 25221 |
| 41 | Low | Service Detection | 2010-08-07 | 75 days | 2010-10-21 | Nessus | 1241 | tcp | nessus | 22964 |
| 42 | Low | SSL Certificate Information | 2010-08-07 | 75 days | 2010-10-21 | Nessus | 1241 | tcp | nessus | 10863 |
| 43 | Low | Remote listeners enumeration | 2010-08-07 | 75 days | 2010-10-21 | Nessus | 1241 | tcp | nessus | 25221 |
| 44 | Low | Nessus Server Detection | 2010-08-07 | 75 days | 2010-10-21 | Nessus | 1241 | tcp | nessus | 10147 |
| 45 | Low | SSL Certificate Expiry-Future Expiry | 2010-08-07 | 75 days | 2010-08-31 | Nessus | 1241 | tcp | nessus | 42981 |

FIG. 6

| Asset List IP Address | | Low | Med | High | Total | First Seen | Last Seen | Assigned To |
|---|---|---|---|---|---|---|---|---|
| 10.121.1.3 | —•  | 23 | 0 | 0 | 23 | 2010-09-21 | 2010-10-21 | MIKE JONES (Affiliate)<br>JOHN SMITH (Affiliate)<br>JOHN SMITH (Affiliate)<br>JAMES COOK (Affiliate) |
| 10.121.1.4 | —•  | 23 | 0 | 0 | 23 | 2010-09-21 | 2010-10-21 | MIKE JONES (Affiliate)<br>JOHN SMITH (Affiliate)<br>JOHN SMITH (Affiliate)<br>JAMES COOK (Affiliate) |
| 10.121.1.5 | —•  | 23 | 0 | 0 | 23 | 2010-09-21 | 2010-10-21 | MIKE JONES (Affiliate)<br>JOHN SMITH (Affiliate)<br>JOHN SMITH (Affiliate)<br>JAMES COOK (Affiliat |
| 10.121.1.6 | —•  | 23 | 0 | 0 | 23 | 2010-09-21 | 2010-10-21 | MIKE JONES (Affiliate)<br>JOHN SMITH (Affiliate)<br>JOHN SMITH (Affiliate)<br>JAMES COOK (Affiliate) |
| 10.122.150.227 | ⌐• | 25 | 6 | 0 | 31 | 2010-08-07 | 2010-10-21 | MIKE JONES (Affiliate)<br>JOHN SMITH (Affiliate) |
| 10.122.150.228 | —• | 22 | 2 | 0 | 24 | 2010-08-07 | 2010-10-21 | MIKE JONES (Affiliate)<br>JOHN SMITH (Affiliate) |
| 10.122.150.229 | _⌐• | 17 | 2 | 0 | 19 | 2010-08-07 | 2010-10-21 | MIKE JONES (Affiliate)<br>JOHN SMITH (Affiliate) |
| 10.122.150.230 | —• | 16 | 2 | 0 | 18 | 2010-08-07 | 2010-10-21 | MIKE JONES (Affiliate)<br>JOHN SMITH (Affiliate) |
| 10.122.150.231 | ⌐• | 37 | 8 | 0 | 45 | 2010-08-07 | 2010-10-21 | MIKE JONES (Affiliate)<br>JOHN SMITH (Affiliate) |
| 10.122.150.232 | ⌐• | 20 | 14 | 12 | 46 | 2010-08-07 | 2010-10-21 | MIKE JONES (Affiliate)<br>JOHN SMITH (Affiliate) |
| 10.122.150.233 | ⌐• | 20 | 14 | 13 | 47 | 2010-08-07 | 2010-10-21 | MIKE JONES (Affiliate)<br>JOHN SMITH (Affiliate) |

*FIG. 7*

ISSO MENU
Asset List   Delta   Exclude Functions   POAM   User Management

Specific Exclude List

| ID | Name | Detection Source | Scanner Reference | Asset | Port | Protocol | Decision Date | Exclude Until | Exclude CR# | Justification | Excluded by | Action |
|---|---|---|---|---|---|---|---|---|---|---|---|---|
| 1300 | LDAP Server NULL Bind Connection Info Disclosure | Nessus | 10723 | 10.122.227.8 | 389 | tcp | 2010-10-14 | | XCETTSK-16 | LDAP server supports LDAP V3 | JAMES COOK (Affiliate) | X |
| 1302 | LDAP NULL BASE Search Access | Nessus | 10722 | 10.122.227.8 | 389 | tcp | 2010-10-14 | | XCETTSK-16 | LDAP server supports LDAP V3 | JAMES COOK (Affiliate) | X |
| 1520 | LDAP Server NULL Bind Connection Info Disclosure | Nessus | 10723 | 10.122.225.14 | 389 | tcp | 2010-10-14 | | XCETTSK-16 | Server supports LDAP V3 | JAMES COOK (Affiliate) | X |
| 1522 | LDAP NULL BASE Search Access | Nessus | 10722 | 10.122.225.14 | 389 | tcp | 2010-10-14 | | XCETTSK-16 | Server supports LDAP V3 | JAMES COOK (Affiliate) | X |
| 1503 | LDAP Server NULL Bind Connection Info Disclosure | Nessus | 10723 | 10.122.225.15 | 389 | tcp | 2010-10-14 | | XCETTSK-16 | Server supports LDAP V3 | JAMES COOK (Affiliate) | X |
| 1505 | LDAP NULL BASE Search Access | Nessus | 10722 | 10.122.225.15 | 389 | tcp | 2010-10-14 | | XCETTSK-16 | Server supports LDAP V3 | JAMES COOK (Affiliate) | X |

Total: 6

Global Exclude List

| Name | Reference | Source | Date | Decision | Justification | CR# | Excluded by Action |
|---|---|---|---|---|---|---|---|
| Nothing Excluded | | | | | | | |

Total: 0

*FIG. 8*

ISSO MENU
Asset List  Delta  Exclude Functions  POAM  User Management

Current Active Users

| Name | Organization | Email | Enroll Date | |
|---|---|---|---|---|
| JOHN SMITH (Affiliate) | General Services Administration | john.smith@yahoo.com | 2009-10-22 | X |
| JAMES COOK | General Services Administration | james.cook@yahoo.com | 2010-09-17 | X |
| MIKE JONES | General Services Administration | mike.jones@yahoo.com | 2010-09-17 | X |
| RICHARD LEE | General Services Administration | richardl@hotmail.com | 2010-09-22 | X |
| MARY WILLIAMS | General Services Administration | williamsmary@hotmail.com | 2010-09-23 | X |

Current Inactive Users
Name  Organization  Email  Enroll Date

Current Enrollment Queue
Name  Email  Date  Invited

Invite New User
User's Full Name
User's Email Address
Send Invitation

COMPUTER NETWORK SECURITY PLATFORM

RELATED APPLICATIONS

This application claims the benefit of the filing date of U.S. Provisional Application No. 61/272,892, filed Nov. 16, 2009, titled "Computer Network Security Platform," of John R. Maguire, incorporated in its entirety herein by reference.

FIELD

The present invention relates generally to computer security, and more particularly, to methods and systems for providing a centralized platform to manage computer security.

BACKGROUND

All information systems may have issues with cybersecurity, network security, insider threats, and general system security. Accordingly, there is a need to preserve security within an information system. "Security" may be defined to include three principles of an information system: (1) confidentiality; (2) integrity, and (3) availability.

SUMMARY

The Noblis ScanCenter™ is a web-based computer security platform configured for the coordination, execution and aggregation of security information. The security platform leverages multiple vulnerability detection methods and systems to provide a centralized platform for computer security. This platform enables an organization to protect the security of its computing systems, and provides a centralized platform to manage the organization's computer security. The platform automatically checks information systems in a routine, near-real time basis, using any number and any variation of commercially available or open source scanner technology to return a list of security problems (i.e., vulnerabilities).

Appropriate personnel may therefore receive notification of security problems in ongoing, near-real-time fashion. This ongoing, near-real time notification allows a security professional or other user to respond to an incident by quickly logging into the system to find a host with a given vulnerability and mitigate the vulnerability, thereby improving security.

The system may also analyze the overall performance of an information security program, including a combination of: the people that fix a problem, how quickly the problem was fixed, what types of problems exist, statistics regarding the number of problems compared to past points in time, the severity of problems, and so forth. These overall performance measures allow a security professional to improve the security of any information system.

Consistent with an embodiment of the present invention, a computer system for managing security information for an organization is disclosed. The computer system comprises a scanner execution module configured to automatically execute at least two scanners in a predetermined interval to analyze potential vulnerabilities of a computer environment associated with the organization; an acquisition module configured to acquire a vulnerability from the scanner execution module; a data store configured to store the vulnerability; a determination module configured to determine a user associated with the analyzed computer environment based on the vulnerability stored in the data store; and a user alert module configured to notify the user of the vulnerability.

Consistent with another embodiment, a computer-implemented method for managing computer security is disclosed. The method comprises automatically executing at least two scanners in a predetermined interval to analyze potential vulnerabilities of a computer environment associated with an organization; acquiring a vulnerability from the at least two scanners; storing the vulnerability in a data store; determining a user associated with the analyzed computer environment based on the vulnerability stored in the data store; and notifying the user of the vulnerability.

Consistent with yet another embodiment, a computer system for managing security information for an organization is disclosed. The system comprises a digital credential module configured to authenticate a user associated with the organization; an asset assignment module configured to assign a security responsibility to the user; a user personalization module configured to specify preferences for the user; a scanner execution module configured to automatically execute at least two scanners in a predetermined interval to analyze security issues of a computer environment; a user alert module configured to notify the user of a security issue received from one of the two scanners; a user engagement module configured to receive a status note related to the security issue, after the notification by the user alert module; and a security metric module configured to issue a report on the security issue.

BRIEF DESCRIPTION OF THE DRAWINGS

FIGS. 4-9 illustrate exemplary user interface displays consistent with an embodiment of the present invention.

DETAILED DESCRIPTION

Reference will now be made in detail to exemplary embodiments, examples of which are illustrated in the accompanying drawings. Wherever possible, the same reference numbers will be used throughout the drawings to refer to the same or like parts.

Cybersecurity, network security, insider threats, and general system security are growing threats to information systems all over the world. A web-based computer security platform consistent with embodiments of the present invention provides a centralized and easily accessible platform for computer security. The platform may automatically scan computer environments using an interval set by a user, with any number and any variation of scanner technology, to return a set of vulnerabilities. Appropriate personnel are then able to receive notification of security problems in an ongoing, near real-time fashion, which in turn enables the ongoing, near real-time mitigation of vulnerabilities.

Figure 1:
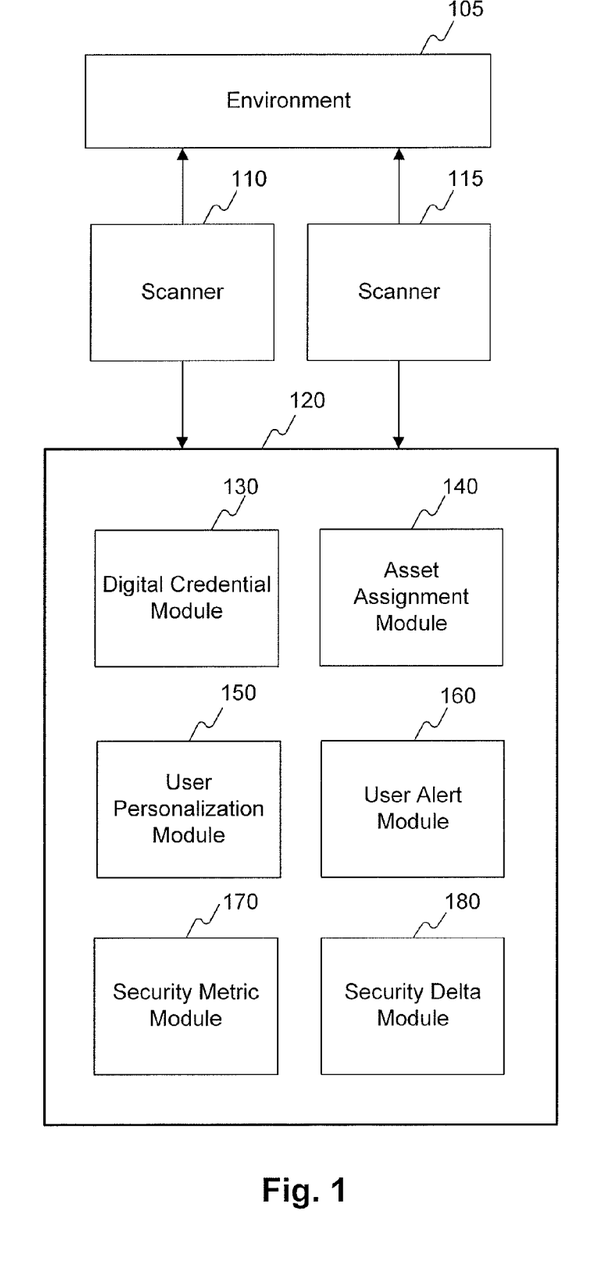
FIG. 1 is a diagram of components in an exemplary security platform system consistent with an embodiment of the present invention.

FIG. 1 illustrates an exemplary computer security platform system consistent with an embodiment of the present invention. Computer security platform systems, such as the one shown, may be used to implement process 200, described in more detail below with respect to FIG. 2.

Environment 105 may be any information system, computer program, or other computing environment that may execute one or more services, programs, enterprise applications, operating systems, platforms, etc. Scanners 110 and 115 may be any technology that probes environment 105, and returns a list of problems with security. Examples of scanners 110 and 115 include commercially available products such as NESSUS™, HP WebInspect software, or open source software such as Nmap.

In one embodiment, scanners 110 and 115 may acquire data from environment 105 and may send the data to computer system 120. Computer system 120 may automatically process data from scanners 110 and 115, along with data from other sources.

Computer system 120 may include Digital Credential Module 130, Asset Assignment Module 140, User Personalization Module 150, User Alert Module 160, Security Metric Module 170, and Security Delta Module 180. Digital Credential Module 130 may be configured to authenticate a user's personal information using, for example, Personal Identity Verification (PIV) and a DoD Common Access Card (CAC). Asset Assignment Module 140 may assign a security responsibility to a user for an asset (e.g., a software application such as a web server), and may also inventory system capability.

User Personalization Module 150 may allow a user to specify preferences, which may be stored between user sessions. User Alert Module 160 may notify specific users of events, e.g., if a vulnerability is detected in an asset that has been associated with a specific user, that user may be notified of that vulnerability. For example, if a security issue is detected in a web server that is associated with John Smith, then Mr. Smith may be notified of that security issue.

Security Metric Module 170 may issue a report on a security issue, which may in some embodiments satisfy federal requirements, regulatory requirements, legal requirements, etc. For example, Security Metric Module 170 may generate reports to satisfy Federal Agency requirements under the Federal Information Security Management Act (FISMA). Security metrics may be used to report to management or other users regarding the overall effectiveness of a security program. The reports or metrics may provide statistics, such as the average time required to mitigate a high risk vulnerability, or the number of vulnerabilities mitigated within a given period of time, for example. Security Metric Module 170 may limit certain reports to a specific period of time. For example, a report may list all vulnerabilities mitigated since the beginning of the year, the beginning of the month, etc.

Security Delta Module 180 may display a change in a security environment for a specified time period, such as what has changed in the security environment of an organization since a previous reporting period. For example, security delta module 180 may issue a report stating that 30 days ago, environment 105 had 10 high risk vulnerabilities; 15 days ago, environment 105 had 19 high risk vulnerabilities; and yesterday, environment 105 had only 4 high risk vulnerabilities. Such data may prove useful for security professionals, who need the ability to compare two points in time for the security state of an environment. Examples of reports on a security issue and changes in a security environment are illustrated and described in more detail with respect to FIGS. 4-6.

One skilled in the art will understand that the system of FIG. 1 is an example of one embodiment consistent with the invention, and it may have parts, modules, hardware components, or software components added, deleted, reordered, or modified without departing from principles of the invention. For example, modules 170 and 180 may be combined, module 130 could be deleted, or any number of additional scanners could be added. As other examples, scanners 110 and 115 could be distributed throughout an enterprise, inside environment 105, or across separate networks.

Figure 2:
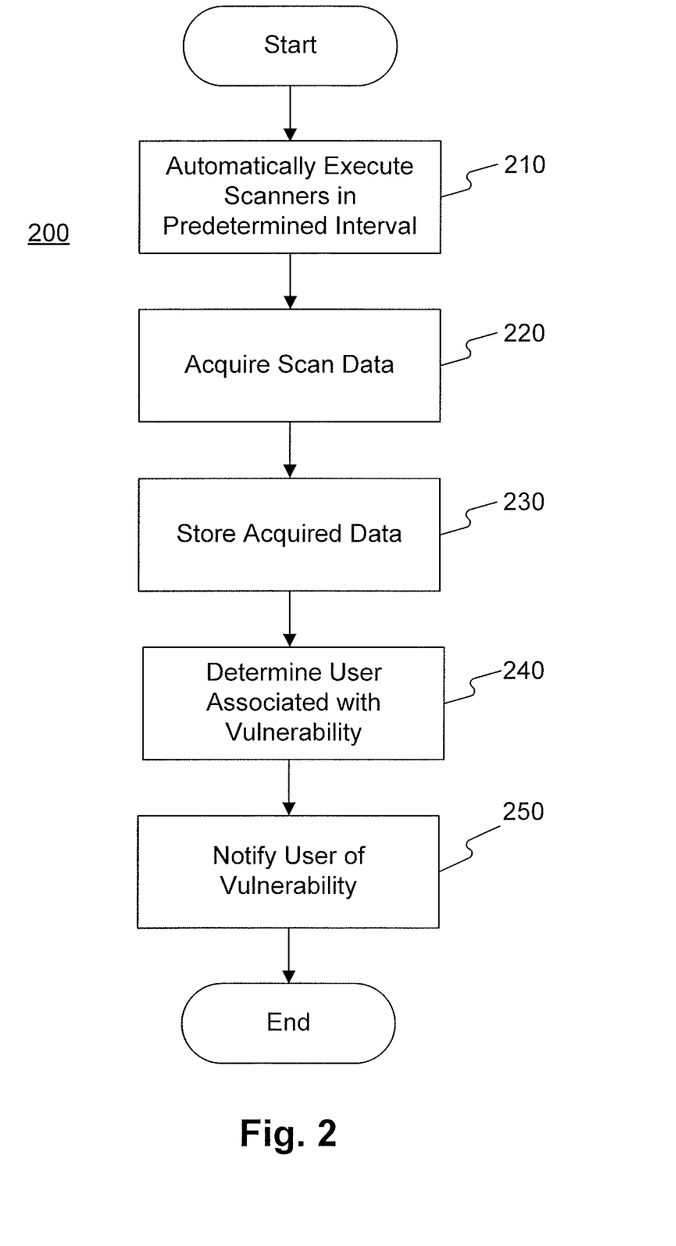
FIG. 2 is a flow diagram of an exemplary process to coordinate, execute, and aggregate information security information consistent with an embodiment of the present invention.

FIG. 2 is a flow diagram of an exemplary process 200 that may be used to coordinate, execute, and aggregate information security information consistent with an embodiment of the present invention. As shown in FIG. 2, process 200, which may be implemented using a computer system, automatically executes two or more scanners in a predetermined interval to analyze potential vulnerabilities of an environment (step 210). The predetermined interval may be chosen by a user, and may be any interval (e.g., hour, day, year, month, week, first Friday of the month, etc.). A user may modify the predetermined interval at any time.

While automatically executing, scanners 110 and 115 may probe environment 105 (e.g., any information system), and discover what assets (e.g., applications) are running on those environments. Scanners 110 and 115 may probe environment 105 with no prior knowledge of environment 105. Scanners 110 and 115 may also check environment 105 for known vulnerabilities. For example, if scanner 110 finds environment 105 is running a web server, scanner 110 may then check the web server to determine which web server manufacturer is running. As an example, if it is an Apache™ web server, scanner 110 may check for known vulnerabilities of the Apache™ web server.

In addition to scanning environment 105 for potential vulnerabilities, scanners 110 and 115 may also scan environment 105 based on an expected configuration of the environment, e.g., what the environment is expected to look like. For example, every federal information system may be required to have an approved security baseline. Before the federal information system goes into operation, developers may specify which specific services should run on each machine, and a senior official may authorize each machine to operate. If changes are requested, the system may have to go through a government change management process, for example to assess the impact of each change on the system, to authorize each change, etc. When scanning, therefore, scanners 110 and 115 may also scan an environment for applications that are not within the specified security baseline. For example, if a scanner detects a web server running where there should be none (e.g., because a web server is not authorized), process 200 may detect that anomaly and treat it as a vulnerability. In this example, the web server itself may have no existing vulnerabilities, but the presence of the web server itself was not authorized for that particular government environment. Accordingly, the presence of the web server may be treated as a vulnerability.

Next, computer system 120 acquires scan data from the scanners, e.g., data regarding vulnerabilities on environment 105 (step 220). A vulnerability in a system may be described as the combination of a host, a port on that host, a protocol, and a security issue reported by a scanner to be present on a specific combination of host, port, and protocol used for access.

Process 200 incorporates the acquired data into a security platform on the system (e.g., ScanCenter™), for example by storing the acquired data in a data store (step 230). Computer system 120 may correlate similar results from different scanners, for instance using a vulnerability correlation module. For example, different scanners may use different terms, such as "critical" or "high risk," to describe the same vulnerability. To correlate these terms and to determine if the terms refer to the same vulnerability, computer system 120 may use a unique, common identifier that is publicly searchable by information security professionals to identify the specific vulnerability (e.g., Common Vulnerabilities and Exposures (CVE®)). In other instances, computer system 120 may correlate results using identifiers from a host, a protocol, a port, a scanner, and a unique identification number from a scanner.

Next, process 200 determines a user associated with the analyzed environment, based on the vulnerability and other information stored in the data store (step 240). For example, computer system may determine that "IP Address 10.121.1.3" is assigned to "John Smith." An example of an asset list that may be used to determine a user associated with a vulnerability is illustrated and described in more detail below with respect to FIG. 7.

Process 200 then notifies the identified user of the vulnerability (step 250). Notification may be made by various modes, for example, via an e-mail, a phone call, a voice message, a mobile phone message, or a text message. The notification may include an identification number for the environment and the scanner, a risk level, a status, a summary of the vulnerability, a detailed description of the vulnerability, advice on how to fix the vulnerability, the impact of the vulnerability on the confidentiality, integrity, and/or availability of the environment, etc. A notification may state, for example:

Vulnerability Details
ID: 1657
Scanner Reference ID: 24907
Found on: 10.122.151.48
Risk: High
Status: Open
Synopsis: The remote web server uses a version of PHP that is affected by multiple flaws; Description: According to its banner, the version of PHP installed on the remote host is older than 5.2.1. Such versions may be affected by several issues, including buffer overflows, format string vulnerabilities, arbitrary code execution, and clobbering of super-globals.
Solution: Upgrade to PHP version 5.2.1 or later.

As another example, if a policy exists in which all vulnerabilities that are classified as "high risk" should be mitigated within thirty days of detection, and if twenty-five days have passed since initial detection, the system may notify a user that he or she has five days remaining in which to mitigate that issue. After users are notified of vulnerabilities, users may have the ability to enter notes, for example about the status of mitigation. These notes may be recorded as part of an official record. This capability engages users and makes them part of an overall security program. In certain embodiments, a user may be required to log into computer system 120 to access the notification, such as through a user authentication process described in more detail below with respect to FIG. 3.

Process 200 may repeat, for example, at the next interval, and may terminate after a specified number of intervals, a specified time period, may run until a user terminates the process, etc. One skilled in the art will understand that the process of FIG. 2 is an example of one embodiment consistent with the present invention, and it may have steps added, deleted, reordered, or modified without departing from principles of the invention. For example, steps 220 and 230 may be combined, or steps 210 and 250 may be deleted.

User Enrollment, Authentication and Authorization Framework

In some embodiments, the system may support government issued digital credentials such as Personal Identity Verification (PIV) (HSPD-12) and DoD Common Access Cards (CAC) for user authentication, including cryptographic tokens to authenticate users.

Systems consistent with embodiments of the invention may also include environments (e.g., government systems) where there is no route or administrative access to the environment. In those environments, as a scanner runs on an interval, it may encrypt scan results and cipher the scan results with strong cryptography. The scanner may then send (e.g., via email) the scan results out of the environment to preserve the confidentiality and integrity of the scan results. Alternatively, scanners may output results out of the environment, and a user may manually take the results and manage the results in a data store outside of the environment.

Systems consistent with embodiments of the invention may also include a robust Role Based Access Control (RBAC) framework in which arbitrary roles may be created to support local working and authorization norms. For example, user authentication may be handled by a digital certificate presented by a user and validated by a web server via out-of-band communication with a certificate issuer. An enrollment and authorization framework is described in more detail with respect to FIG. 3 below.

Figure 3:
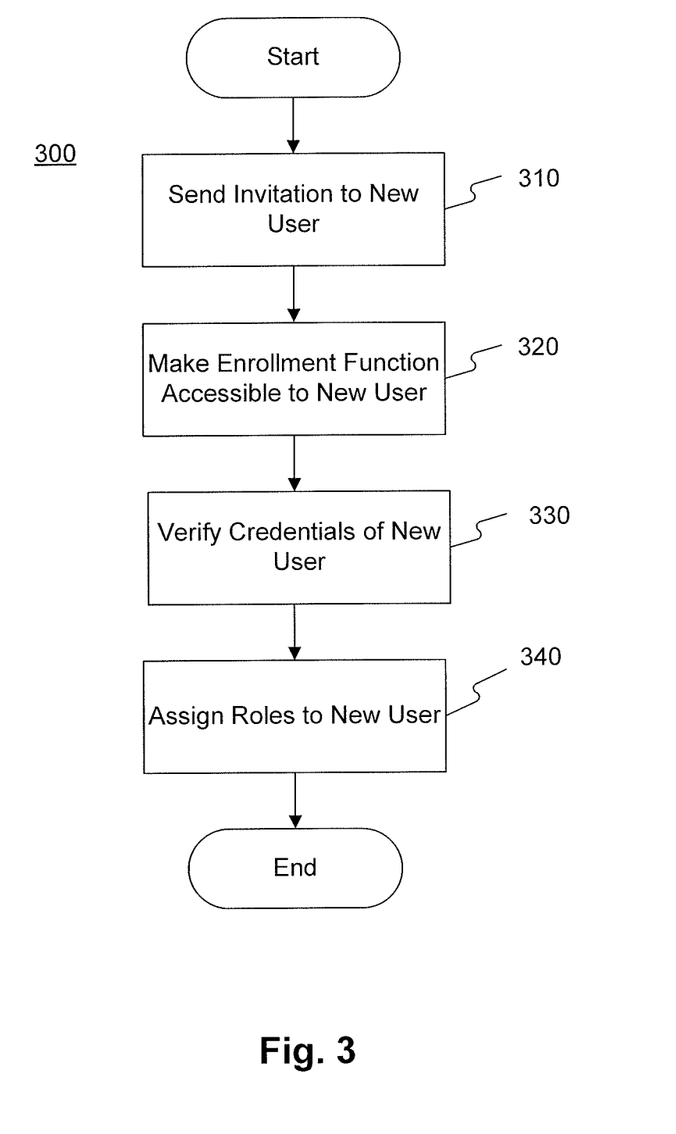
FIG. 3 is a flow diagram of an exemplary process to enroll and authenticate a user of a security system consistent with an embodiment of the present invention.

FIG. 3 is a flow diagram of an exemplary process 300 to enroll and authenticate a user into a security system, consistent with an embodiment of the present invention. In certain embodiments (not shown), a user, for example a user with the role of "Sponsor," may sponsor another user into the system by adding the new user's personal information, such as name, email address, etc., as well as their level of authorization—what they will be entitled to do on the system once their account is active. As shown in FIG. 3, when a new user is added, a system implementing process 300 sends an invitation to the new user (step 310), for example to the new user's email address provided during sponsorship. Next, the enrollment function of the security platform (e.g., ScanCenter™) is made available to the new user (step 320). In certain embodiments, the invitation is an email containing some background text about the enrollment process as well as a "nonce" and a hyperlink to the enrollment function on the security platform. Once the user clicks on the hyperlink, he or she is taken to the enrollment function on the security platform (which may, in certain embodiments, use client-side certificate authentication).

The process verifies the credentials of the new user (step 330), and assigns applicable roles to the new user (step 340). For example, in one embodiment consistent with the present invention, the system implementing process 300 may check the new user's credentials, for example using Digital Credential Module 130 shown in FIG. 1, to ensure that the credentials have not been revoked by their issuer, and the new user may provide the nonce to the system. In this embodiment, enrollment is complete if the nonce matches the local value. The new user is added to the local authorization database and assigned applicable roles, which his or her sponsor may have previously provided to the system.

Asset Management

In certain embodiments, a system implementing process 200 may generate manager friendly graphs or other aids to help assist with program decisions, such as deciding which issues to address first, or, given a limited amount of time, deciding which issues to fix in order to provide the greatest security benefit. In certain embodiments, the system may show a security manager what has changed in the environment since the last reporting period. This functionality may be implemented by a Management Dashboard, which may indicate, for example, the number of new vulnerabilities detected during a specified time period.

Figure 4:
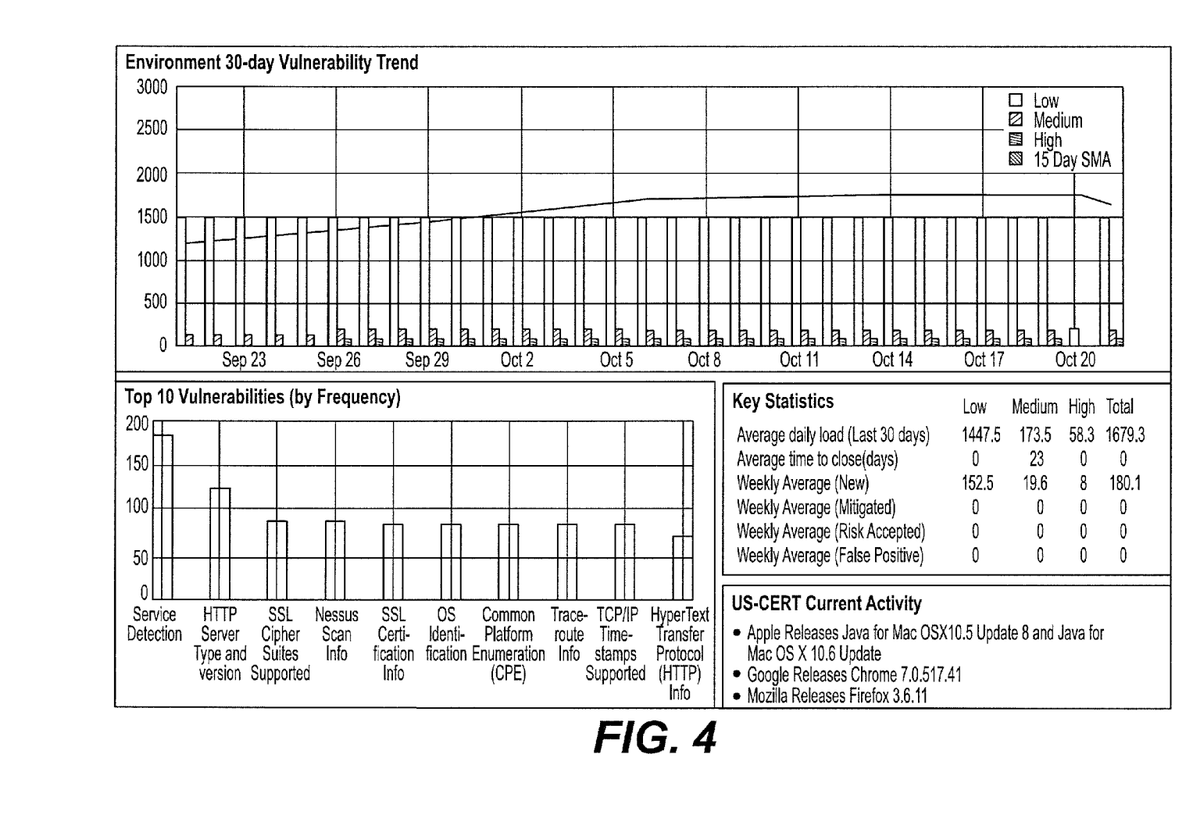

FIG. 4 illustrates an exemplary user interface display consistent with an embodiment of the present invention for generating a Management Dashboard. Computer system 120 may present an "Environment 30 Day Vulnerability Trend" as shown in FIG. 4, which may provide trend data related to the number of vulnerabilities in the past 30 days. As shown in FIG. 4, system 120 may also present the "Top 10 Vulnerabilities" and "Key Statistics," such as the Weekly Average of new "low" risk vulnerabilities, along with other data related to current system changes and updates.

Figure 5:
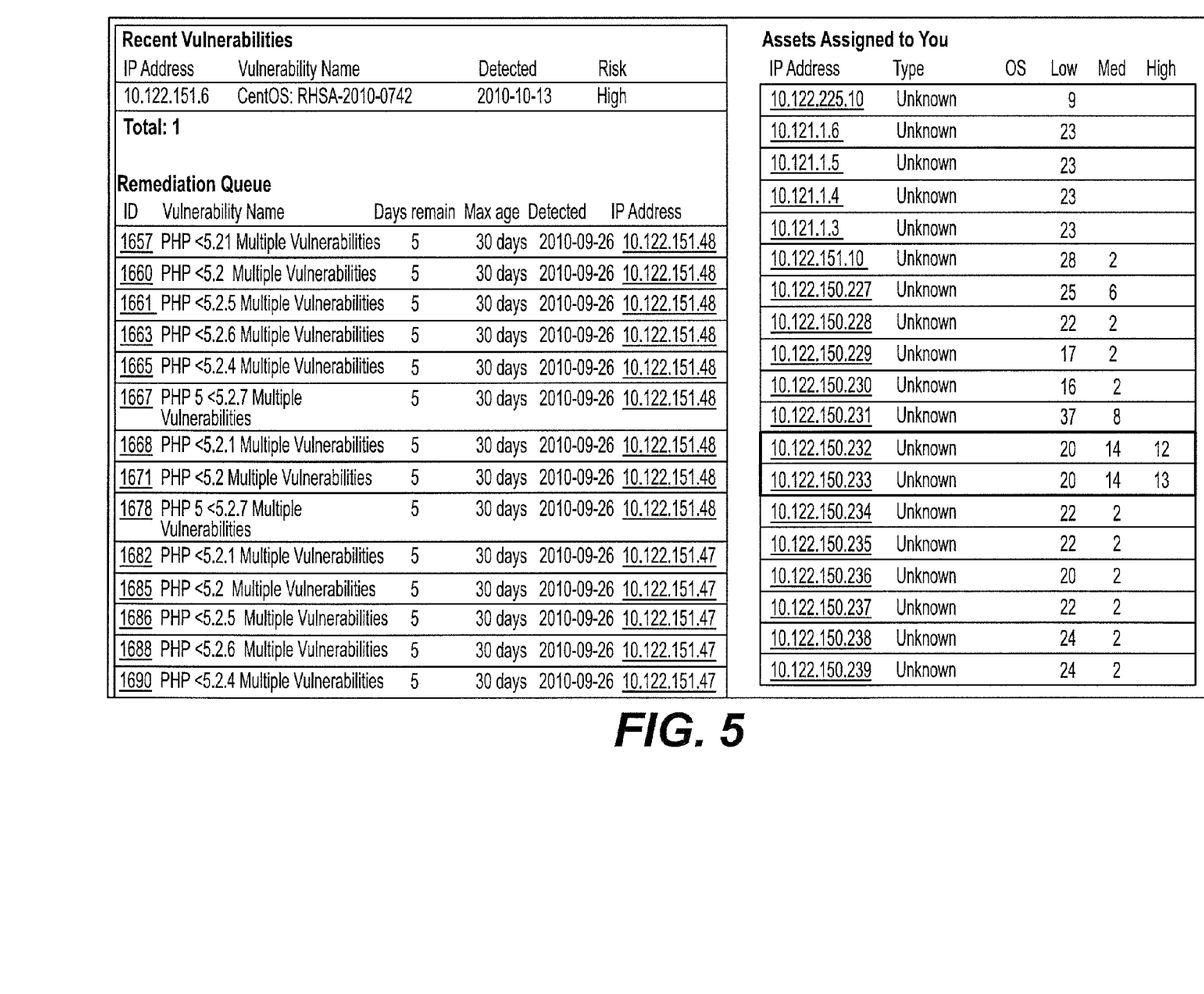

FIG. 5 illustrates an exemplary user interface display consistent with an embodiment of the present invention for displaying a list of vulnerabilities. Computer System 120 may present a list of "Recent Vulnerabilities," a "Remediation Queue," (i.e., a list of assets to fix) and a list of "Assets Assigned to You." Certain assets in the list, may be boxed, highlighted, or otherwise differentiated from the other assets to indicate the presence of a "high" risk, for example.

Figure 6:
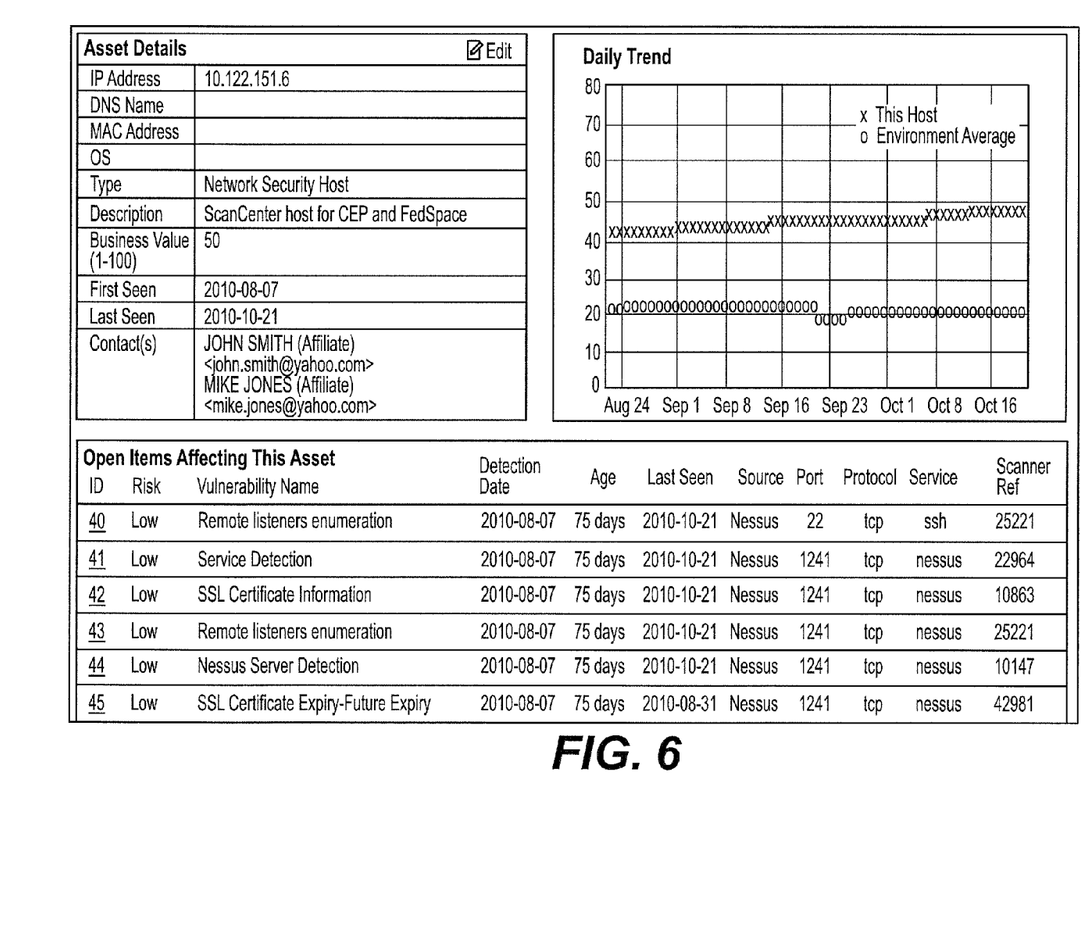

If a user selects or clicks on a specific asset, computer system 120 may present more details regarding the asset. FIG. 6 illustrates an exemplary user interface display consistent with an embodiment of the present invention for displaying asset details. As shown in FIG. 6, "Asset Details" may include an "IP address," a "Type" of asset, a "Description" of the asset, a "Business Value," a "First Seen" date, a "Last Seen date," "Contact" information for the asset, etc. Computer system 120 may also present a "Daily Trend" graph showing the number of vulnerabilities on a particular host compared to an average environment. As shown in FIG. 5, a list of "Open Items Affecting This Asset" may present a user with a list of vulnerabilities, their associated risks, their detection date, age, last seen date, source, port, protocol, service, scanner reference identification number, etc. The information displayed in FIGS. 4-6 may be managed, for example, by User Alert Module 160.

Additionally, a user may have the ability to specify preferences that are remembered between sessions, for example using User Personalization Module 150. In certain embodiments, users are able to view only those assets that have been assigned to them.

Figure 7:
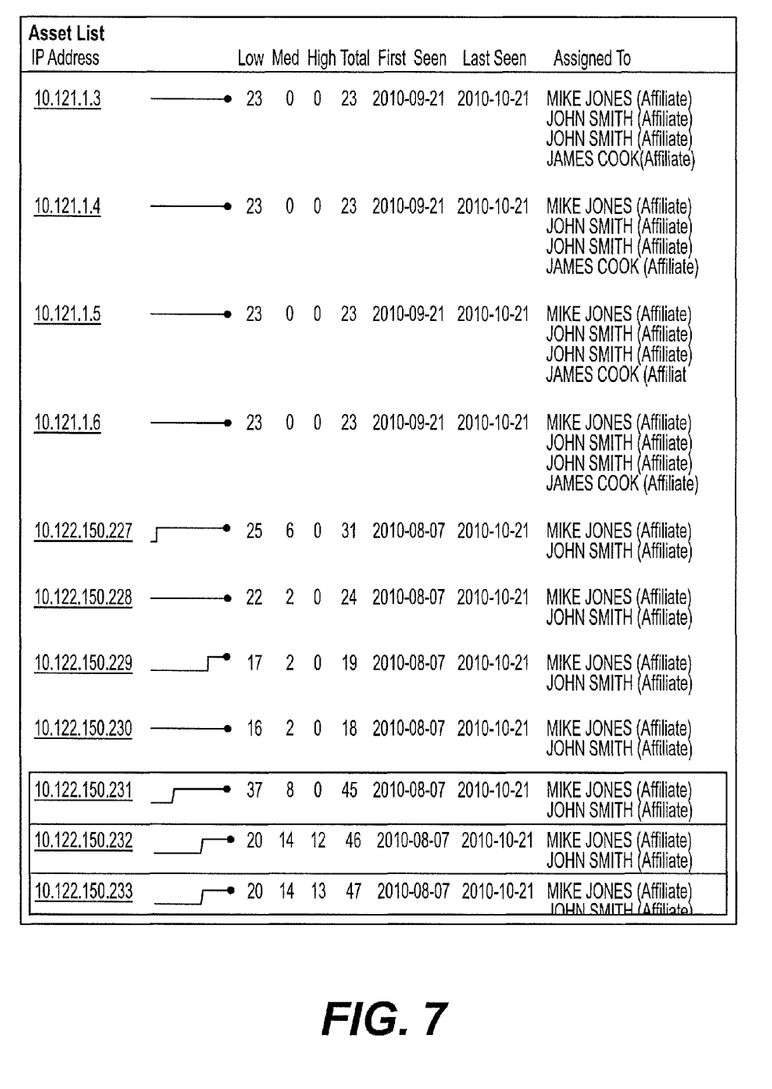

FIG. 7 illustrates an exemplary user interface display consistent with an embodiment of the present invention for managing asset details. An administrator may utilize the user interface shown in FIG. 7 to view and edit multiple assets from an environment. As shown in FIG. 7, the management "Asset List" may display a list of "IP Address," a trend graph, a "Low," "Med," "High," and Total" number of risk levels, "First Seen" and "Last Seen" dates, and an "Assigned to" list of people to whom each asset is assigned. The information displayed in FIG. 7 may be managed, for example, by Asset Assignment Module 140.

ISSO/ISSM Roles

In some embodiments, process 200 may exclude certain vulnerabilities from display or from notification based on user selections. For example, if the cost or risk of change in patching a software hole in an older satellite system is greater than the possibility of having the vulnerability exploited, a user may choose to "exclude," "override" or "accept" the risk.

In one embodiment, the security platform may provide for users who have the role of Information System Security Officer ("ISSO") or Information System Security Manager ("ISSM"). These and other users may have the ability to exclude certain vulnerabilities (e.g., "false positives" or "accepted risks") from display or inclusion in various reports or workflows. In certain embodiments, an exclusion may be permanent, or for a limited time period. In such a way, a system may learn which results to display for each user.

FIG. 8 illustrates an exemplary user interface display consistent with an embodiment of the present invention for excluding assets. As shown in FIG. 8, an administrator may utilize a "Specific Exclude List", i.e., a list of assets excluded by or for specific users, along with a "Global Exclude List", i.e., a list of assets excluded for all users. The information displayed in FIG. 8 may be managed, for example, by Asset Assignment Module 140.

The ISSO or ISSM may also have the ability to adjust the "severity" or "risk" rating of a specific vulnerability either up or down based on factors such as the local environment and norms. For example, a vulnerability that would otherwise be classified as low risk, but that is present in a host that controls a nuclear reactor, might be upgraded to "medium" risk simply because of the significant amount of risk that the local environment and conditions add.

Figure 9:
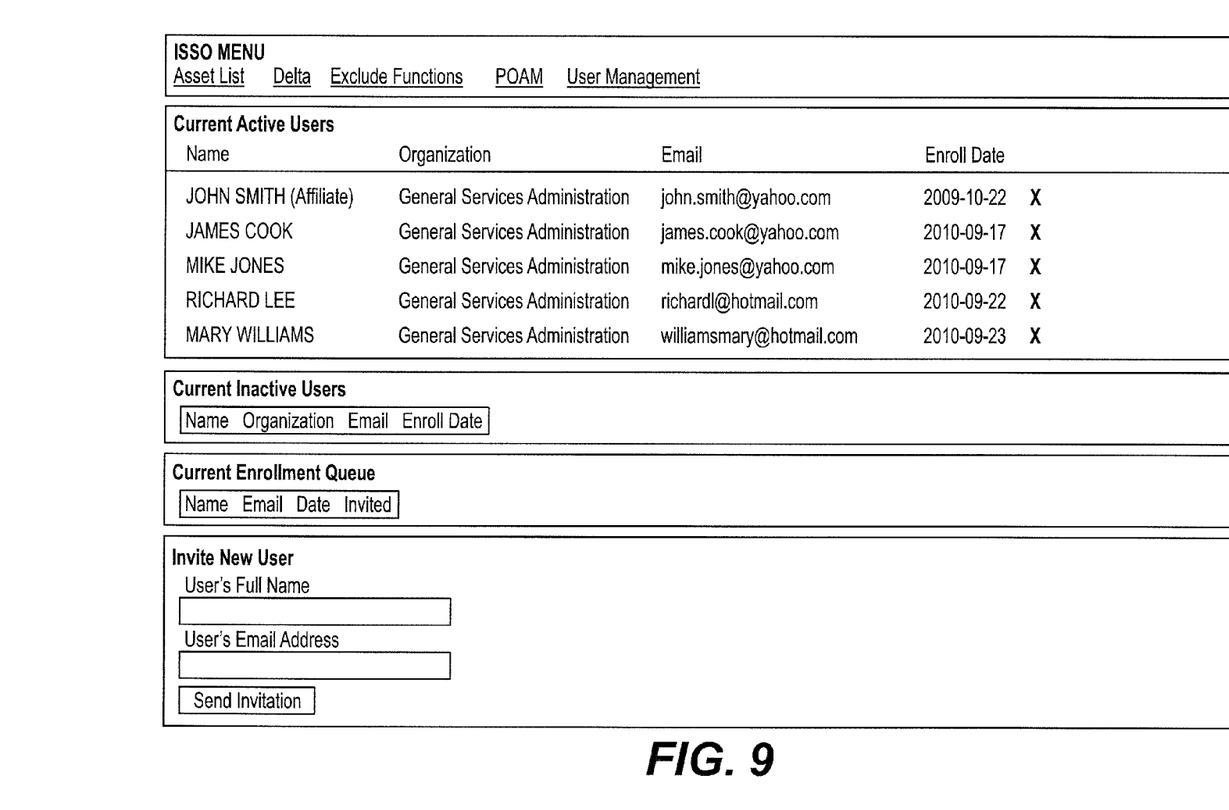

The ISSO or ISSM may also have the ability to invite new users, view and edit a list of active users, and view and edit a list of users waiting to be enrolled. FIG. 9 illustrates an exemplary user interface display consistent with an embodiment of the present invention for managing users. As shown in FIG. 9, the ISSO or ISSM may display "Current Active Users," "Current Inactive Users," a "Current Enrollment Queue," "Invite New User," etc. The ISSO or ISSM may have the ability to assign security responsibility to specific users for specific assets. This ability may also be used as a system inventory capability, and may be used for certification, accreditation, and other policy activities.

A web-based computer security system consistent with embodiments of the present invention provides an accessible, central, and manageable platform for mitigating vulnerabilities in information systems. The platform may automatically scan computer environments using on a regular interval, using any number of commercially available and/or open source scanners. Appropriate personnel are then able to receive notification of security problems in an ongoing, near real-time fashion. As a result, the computer security system allows for the ongoing, near real-time mitigation of vulnerabilities in all kinds of information systems.

One skilled in the art will recognize that the graphs, data, and information shown in FIGS. 4-9 and in the other figures in this application are merely for illustration, and that graphs and information in the figures may be added, deleted, or modified.

Figure 10:
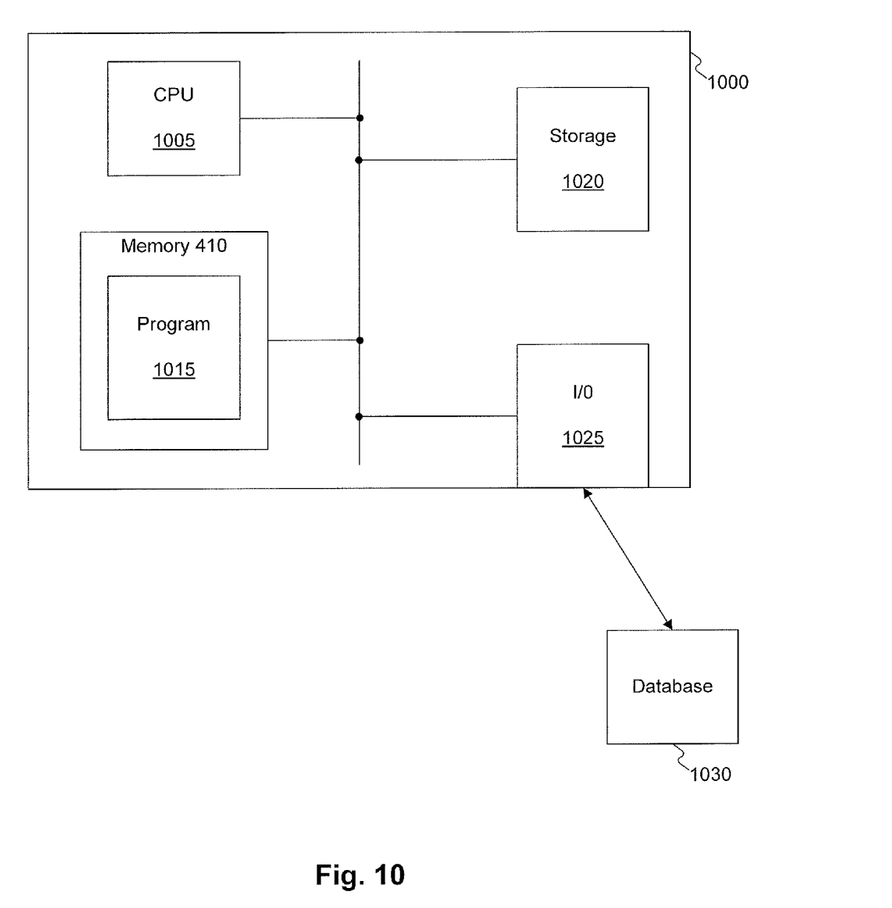
FIG. 10 is a block diagram of an exemplary data processing system that may be used to implement embodiments consistent with principles of the invention.

FIG. 10 is a block diagram of an exemplary data processing system that may be used to implement embodiments consistent with principles of the invention. The components and arrangement, however, may be varied within principles of the present invention. Data processing or computing system 1000 includes a number of components, such as a central processing unit (CPU) 1005, a memory 1010, an input/output (I/O) device(s) 1025, a nonvolatile storage device 1020, and a database 1030. System 1000 can be implemented in various ways. For example, an integrated platform (such as a workstation, personal computer, laptop, etc.) may comprise CPU 1005, memory 1010, nonvolatile storage 1020, and I/O devices 1025. In such a configuration, components 1005, 1010, 1020, and 1025 may connect through a local bus interface and access database 1030 (shown implemented as a separate database system) via an external connection. This connection may be implemented through a direct communication link, a local area network (LAN), a wide area network (WAN) and/or other suitable connections. System 1000 may be standalone or it may be part of a subsystem, which may, in turn, be part of a larger system.

CPU 1005 may be one or more known processing devices, such as a microprocessor from the Pentium™ family manufactured by Intel™ or the Turion™ family manufactured by AMD™. Memory 1010 may be one or more storage devices configured to store information used by CPU 1005 to perform certain functions related to embodiments of the present invention. Storage 1020 may be a volatile or non-volatile, magnetic, semiconductor, tape, optical, removable, nonremovable, or other type of storage device or computer-readable medium. In one embodiment consistent with the invention, memory 1010 includes one or more programs or subprograms 1015 loaded from storage 1020 or elsewhere that, when executed by CPU 1005, perform various procedures, operations, or processes consistent with the present invention. For example, memory 1010 may include a security management program that manages user security roles, an asset assignment program that assigns security responsibilities to specific users for specific assets, and a web-based software platform that links the other programs and allows them to use a common database, provides a common user interface, performs basic bookkeeping tasks, manage an organization's information security, and provide user guidance. Memory 1010 may also include other programs that perform other functions and processes, such as programs that provide communication support, Internet access, etc.

Methods, systems, and articles of manufacture consistent with the present invention are not limited to separate programs or computers configured to perform dedicated tasks. For example, memory 1010 may be configured with a program 1015 that performs several functions when executed by CPU 1005. For example, memory 410 may include a single program 1015 that performs the functions of a security management program and an asset assignment program. Moreover, CPU 1005 may execute one or more programs located remotely from system 1000. For example, system 1000 may access one or more remote programs that, when executed, perform functions related to embodiments of the present invention.

Memory 1010 may be also be configured with an operating system (not shown) that performs several functions well known in the art when executed by CPU 405. By way of example, the operating system may be Microsoft Windows™, Unix™ Linux™, an Apple Computers operating system, Personal Digital Assistant operating system such as Microsoft CE™, or other operating system. The choice of operating system, and even to the use of an operating system, is not critical.

I/O device(s) 1025 may comprise one or more input/output devices that allow data to be received and/or transmitted by system 1000. For example, I/O device 425 may include one or more input devices, such as a keyboard, touch screen, mouse, and the like, that enable data to be input from a user, such as security preferences, notes about the status of mitigation, etc. Further, I/O device 1025 may include one or more output devices, such as a display screen, CRT monitor, LCD monitor, plasma display, printer, speaker devices, and the like, that enable data to be output or presented to a user. I/O device 1025 may also include one or more digital and/or analog communication input/output devices that allow computing system 1000 to communicate with other machines and devices, such as scanners 110 and 115. System 1000 may input data from external machines and devices and output data to external machines and devices via I/O device 1025. The configuration and number of input and/or output devices incorporated in I/O device 1025 are not critical.

System 1000 may also be communicatively connected to a database 1030. Database 1030 may comprise one or more databases that store information and are accessed and/or managed through system 1000. By way of example, database 1030 may be an Oracle™ database, a Sybase™ database, or other relational database. Database 1030 may include, for example, data and information related to vulnerabilities, user preferences, mitigation statuses, security metrics, user enrollment information, etc. Systems and methods of the present invention, however, are not limited to separate databases or even to the use of a database.

Other embodiments will be apparent to those skilled in the art from consideration of the specification and practice of the examples disclosed herein. It is intended that the specification and examples be considered as exemplary only.

What is claimed is:

1. A computer system for managing security information for an organization, comprising:
   one or more memories storing instructions; and
   one or more processors configured to execute the instructions to perform:
   receiving scan data from at least two scanners to analyze potential vulnerabilities of a computer environment associated with the organization;
   detecting one or more vulnerabilities from the scan data;
   correlating the scan data received from the at least two scanners to determine whether information included in the scan data relates to the same vulnerability;
   determining that at least one of the detected vulnerabilities is an excluded vulnerability based on a risk rating of the at least one of the detected vulnerabilities;
   determining a user associated with the analyzed computer environment based on the one or more detected vulnerabilities; and
   generating a report that includes the one or more detected vulnerabilities but not the excluded vulnerability.

2. The computer system of claim 1, wherein the one or more processors are further configured to execute the instructions to perform:
   generating a user interface that displays vulnerability data, the vulnerability data including trend data representing a total number of vulnerabilities detected in the system at different points in time over a first time period.

3. The computer system of claim 2, wherein the vulnerability data further includes top vulnerability data representing a group of two or more of the most frequently detected types of vulnerabilities over a second time period.

4. The computer system of claim 1, wherein the one or more detected vulnerabilities include: a known security issue associated with the computer environment, and a configuration of the computer environment.

5. The computer system of claim 1, wherein the one or more processors are further configured to execute the instructions to perform:
   notifying the user of the one or more detected vulnerabilities by at least one of: an e-mail, a phone call, a voice message, a mobile phone message, and a text message.

6. The computer system of claim 1, wherein the scan data includes scan data scanned from the at least two scanners over a predetermined interval set by the user.

7. The computer system of claim 1, wherein the one or more processors are further configured to execute the instructions to perform:
   modifying a risk rating associated with the one or more detected vulnerabilities.

8. A computer-implemented method for managing computer security, comprising:

receiving scan data from at least two scanners to analyze potential vulnerabilities of a computer environment associated with an organization;

detecting one or more vulnerabilities from the scan data;

correlating the scan data received from the at least two scanners to determine whether information included in the scan data relates to the same vulnerability;

determining that at least one of the detected vulnerabilities is an excluded vulnerability based on a risk rating of the at least one of the detected vulnerabilities;

determining a user associated with the analyzed computer environment based on the one or more detected vulnerabilities; and generating a report that includes the one or more detected vulnerabilities but not the excluded vulnerability.

9. The computer-implemented method of claim 8, further comprising:

generating a user interface that displays vulnerability data, the vulnerability data including trend data representing a total number of vulnerabilities detected in the system at different points in time over a first time period.

10. The computer-implemented method of claim 9, wherein the vulnerability data further includes top vulnerability data representing a group of two or more of the most frequently detected types of vulnerabilities over a second time period.

11. The computer-implemented method of claim 8, wherein the one or more detected vulnerabilities include: a known security issue associated with the computer environment, and a configuration of the computer environment.

12. The computer-implemented method of claim 8, further comprising:

notifying the user of the one or more detected vulnerabilities by at least one of: an e-mail, a phone call, a voice message, a mobile phone message, and a text message.

13. The computer-implemented method of claim 8, wherein the scan data includes scan data scanned from the at least two scanners over a predetermined interval set by the user.

14. The computer-implemented method of claim 8, further comprising:

modifying a risk rating associated with the one or more detected vulnerabilities.

15. A computer system for managing security information for an organization, comprising:

one or more memories storing instructions; and one or more processors configured to execute the instructions to perform:

authenticating a user associated with the organization;

assigning a security responsibility to the user;

specifying preferences for the user;

receiving scan data from at least two scanners to analyze security issues of a computer environment associated with the organization;

detecting one or more vulnerabilities from the scan data;

correlating the scan data received from the at least two scanners to determine whether information included in the scan data relates to the same vulnerability;

determining that at least one of the detected vulnerabilities is an excluded vulnerability based on a risk rating of the at least one of the detected vulnerabilities;

determining a user of a security issue based on the one or more detected vulnerabilities; and generating a report on the security issue that includes the one or more detected vulnerabilities but not the excluded vulnerability.

16. The computer system of claim 15, wherein the one or more processors are further configured to execute the instructions to perform:

modifying a risk rating associated with the security issue based on the detected vulnerability.

17. The computer system of claim 15, wherein authenticating a user includes analyzing government issued digital credentials.

18. The computer system of claim 15, wherein the one or more processors are further configured to execute the instructions to perform:

displaying a change in a security environment of an organization for a specified time period, based on the security issue.

* * * * *